(No Model.)
J. P. BURNHAM.
MACHINE FOR FORMING INTERFITTING TONGUES AND GROOVES IN ENDS OF FLOORING BOARDS.
No. 517,326. Patented Mar. 27, 1894.
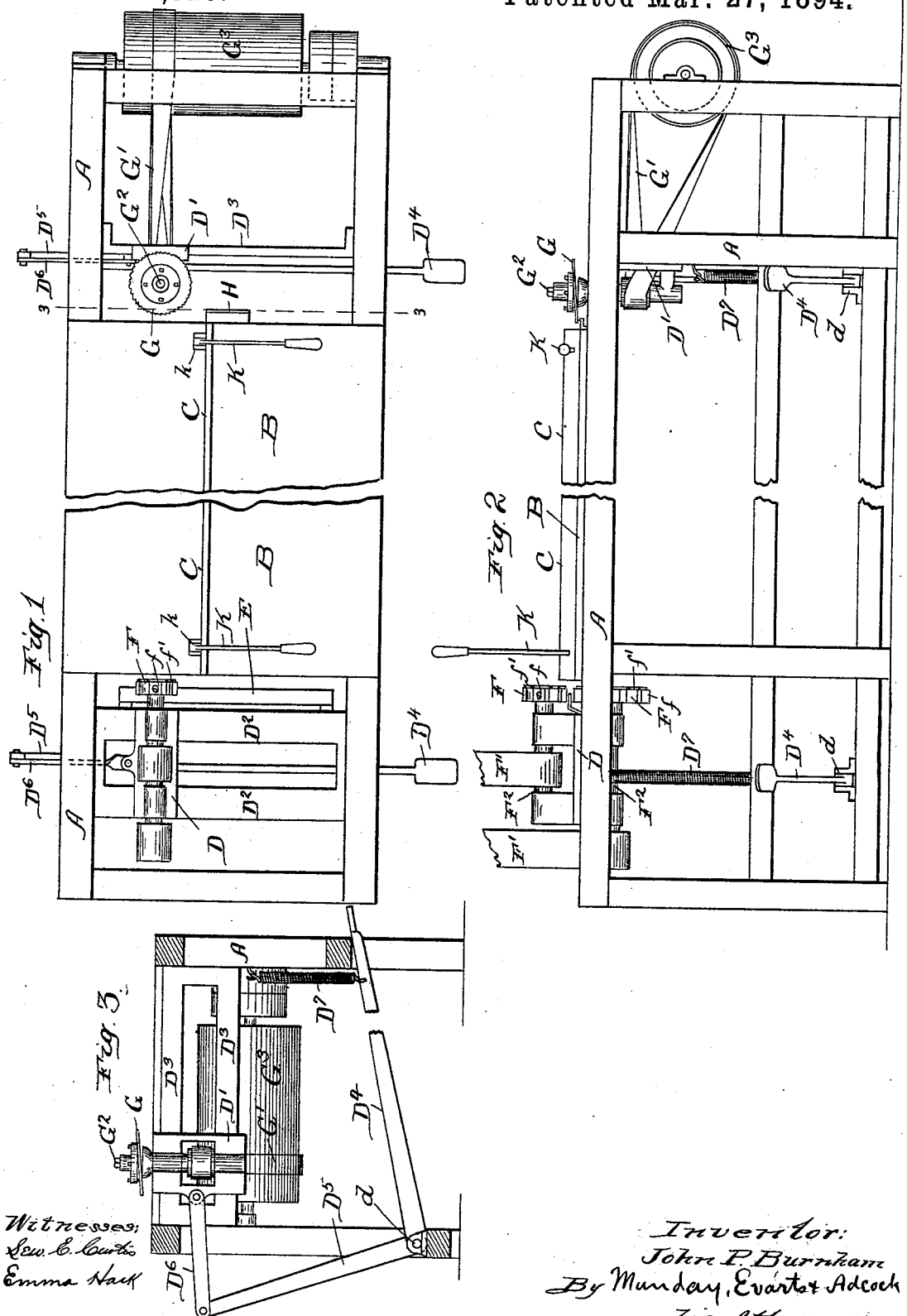
Witnesses:
Geo. E. Curtis
Emma Hack
Inventor:
John P. Burnham
By Munday, Evarts & Adcock
his Attorneys.

UNITED STATES PATENT OFFICE.

JOHN P. BURNHAM, OF CHICAGO, ILLINOIS, ASSIGNOR TO THOMAS WILCE, OF SAME PLACE.

MACHINE FOR FORMING INTERFITTING TONGUES AND GROOVES IN ENDS OF FLOORING-BOARDS.

SPECIFICATION forming part of Letters Patent No. 517,326, dated March 27, 1894.

Application filed October 18, 1893. Serial No. 488,452. (No model.)

*To all whom it may concern:*

Be it known that I, JOHN P. BURNHAM, a citizen of the United States, residing in Chicago, in the county of Cook and State of Illinois, have invented a new and useful Improvement in Machines for Forming Interfitting Tongues and Grooves in the Ends of Flooring-Boards, of which the following is a specification.

My invention relates to machines for forming interfitting tongues and grooves in the opposite ends of flooring boards or strips.

My invention consists in the novel combinations of parts and devices herein shown and described, and more particularly pointed out in the claims.

In the accompanying drawings forming a part of this specification, Figure 1 is a plan view of a machine embodying my invention. Fig. 2 is a side elevation. Fig. 3 is a section on line 3—3 of Fig. 1.

Like letters of reference indicate like parts in all the figures of the drawings.

Referring to the drawings A represents the frame, B the work table for supporting the board to be tongued and grooved at its ends.

C is the guide for the work or board.

D and D' are two independently reciprocating slides or cross heads adapted to move back and forth transversely across the table B first one and then the other.

E is a stop secured to the fixed frame work of the machine against which the end of the board abuts while the tongue is being formed by the two vertically revolving cutter heads F F mounted upon the slide D. The cutter heads F each have peripheral knives $f$ and radial or vertical knives $f'$. The stop E is thin and located between the cutters F F so as not to interfere with the operation of the rotary cutters in forming the tongue upon the end of the board.

G is a horizontally revolving cutter or saw, preferably a wabble saw, mounted on the other slide or cross head D', and operating to form the groove on the opposite end of the board. H is the stop against which this end of the board abuts while the groove is being formed in the same, by the cutter or saw G.

K and K are clamp levers pivoted to the table B at $k$ near the ends of the same for holding the board or work down firmly in place against the guide C on the table B while being operated upon at either end. The transversely reciprocating slides or cross heads D D' move back and forth across the table in suitable guides or ways $D^2$ $D^3$ provided for the purpose. Each of the slides D D' is reciprocated independently of the other by means of a separate treadle $D^4$ pivoted to the frame at $d$ and having an arm $D^5$ connected by a pivoted link $D^6$ to the slides D D'. A coil spring $D^7$ connected at one end to the frame and at the other end to the treadle serves to retract each of the slides D D' and to hold the same normally in their retracted position so that each slide will not interfere with the operation of the other or of the guide C in holding the board in proper position for operation of the cutters carried by said slides. The flooring boards, it will be understood, are of varying lengths, and often comparatively long, so that unless the slides D D' were made to reciprocate independently of each other and the one held in its retracted position while the other is in operation, the guide C could not properly cooperate with both slides in turn, because one slide would be in the way of the board and prevent its being held properly against the guide C while being operated upon by the other slide D and its cutter.

F' F' are belts for driving the shafts $F^2$ $F^2$ of the rotary cutters F F, said belts extending down vertically from pulleys overhead so as to permit the transverse movement of the slide D.

G' is the belt for driving the shaft $G^2$ of the cutter G, the same permitting the transverse travel of the slide D' by traveling on the long driving pulley $G^3$.

I claim—

1. In a machine for forming interfitting tongues and grooves on the opposite ends of flooring boards or strips, the combination of a table B provided with a guide C of two independently reciprocating slides or cross heads, a pair of rotary tongue forming cutters mounted on one of said slides, and a groove forming rotary cutter mounted on the other of said slides, substantially as specified.

2. In a machine for forming interfitting tongues and grooves on the opposite ends of flooring boards or strips, the combination of a table B provided with a guide C of two independently reciprocating slides or cross heads, a pair of rotary tongue forming cutters mounted on one of said slides, a groove forming rotary cutter mounted on the other of said slides, and two clamps for holding the work in position on said table against said guide, substantially as specified.

3. In a machine for forming interfitting tongues and grooves on the opposite ends of flooring boards or strips, the combination of a table B provided with a guide C of two independently reciprocating slides or cross heads, a pair of rotary tongue forming cutters mounted on one of said slides, a groove forming rotary cutter mounted on the other of said slides, two clamps for holding the work in position on the table against said guide, and two separate treadles one connected to each of said slides for operating the same, substantially as specified.

4. In a machine for forming interfitting tongues and grooves on the opposite ends of flooring boards or strips, the combination of a table B provided with a guide C of two independently reciprocating slides or cross heads, a pair of rotary tongue forming cutters mounted on one of said slides a groove forming rotary cutter mounted on the other of said slides, and two stops E and H for the ends of the board to abut against, substantially as specified.

5. In a machine for forming interfitting tongues and grooves on the opposite ends of flooring boards or strips, the combination of a table B provided with a guide C of two independently reciprocating slides or cross heads, a pair of rotary tongue forming cutters mounted on one of said slides, a groove forming rotary cutter mounted on the other of said slides, and two clamps for holding the work in position on said table against said guide, and two stops for the ends of the board to abut against substantially as specified.

JOHN P. BURNHAM.

Witnesses:
EDMUND ADCOCK,
LEW. E. CURTIS.